July 7, 1970  F. A. PURDY  3,519,055
MOTOR OPERATED DOOR

Original Filed Oct. 2, 1964  7 Sheets-Sheet 1

Fig. 1.

United States Patent Office 3,519,055
Patented July 7, 1970

3,519,055
MOTOR OPERATED DOOR
Frederick A. Purdy, 521 Park Ave.,
New York, N.Y. 10021
Original application Oct. 2, 1964, Ser. No. 401,264, now Patent No. 3,444,344. Divided and this application Dec. 31, 1968, Ser. No. 805,071
Int. Cl. E05f *11/54, 15/00*
U.S. Cl. 160—188                                              7 Claims

ABSTRACT OF THE DISCLOSURE

A motor operated door comprising a door guided and supported by tracks having a longitudinal opening along one side in which rollers held by brackets attached to the door are guided, a motor at the rear end of said track, said motor having a drive sheave, a slanted pulley on the door frame, a cable around said drive sheave and said pulley forming an endless belt and a link connecting said cable to the axle pin of the rearmost of said rollers for opening and closing said door as said cable is driven by said drive sheave around said pulley.

---

The present application is a division of application Ser. No. 401,264 filed Oct. 2, 1964 now Pat. No. 3,444,344 which application is a continuation-in-part of application Ser. No. 226,411, filed Sept. 26, 1962 and now abandoned. The present invention relates to a motor drive, drive sheave, pulley and cable arrangement for opening and closing a door.

Progressive improvements, some of which may be indicated in this application, appear in my patents already issued and in my applications pending, as here listed: identification letters are intended for reference in this text.

| Identi-fication | Patent No. | Date of issue | Serial No. | Date of filing |
|---|---|---|---|---|
| "A" | 2,758,836 | Aug. 14, 1956 | 290,859 | May. 31, 1952 |
| "B" | 2,876,002 | Mar. 3, 1959 | 526,035 | Aug. 2, 1955 |
| "C" | 3,048,761 | Aug. 7, 1962 | 687,509 | Oct. 1, 1957 |
| "D" | 3,060,361 | Oct. 23, 1962 | 84,848 | Jan. 25, 1961 |
| "E" | 3,147,001 | Sept. 1, 1964 | 669,143 | July 1, 1957 |
| "F" | | | 104,769 | Mar. 3, 1961 |
| "G" | | | 202,817 | June 15, 1962 |
| "H" | | | 226,411 | Sept. 26, 1962 |

OBJECTS OF INVENTION

An object of this invention is to provide a switch for opening and closing the circiut of electric current to the door-drive motor, which not only provides the path for current to energize the door-drive motor, but draws upon current in a polarity to drive the door in one direction to close, and in a polarity to drive the door in the opposite direction to open, also to provide a switch, having path and polarity functions combined in one device, which has, under given conditions, an inherent bias toward the needed polarity, and under opposite conditions an inherent bias toward the opposite polarity.

As may be observed in all of my patents and applications, as above listed, the switch to supply motive power to the door-drive motor has been separate from, not embodied within, the reversing switch that elects the polarity of the current to determine the direction of rotation of the motor.

A further object is to provide such a switching-device, its bias held positively until released, with a releasing means susceptible of responding to a relatively gentle impulse applied by a timing-actuator such as shown in patent listed as "A." Patent "C" shows an actuator of two chambers, one here called a "pivotal chamber," and one a "hammer-chamber." Within is a flowable material movable by graivty from chamber to chamber. This is a timer and actuator of great simplicity and practicability. The preponderance in force of inertia at the hammer-chamber when charged with flowable material, does not greatly exceed the force of inertia of the empty shell of the hammer-chamber. An object of this invention is to gain reliable advantages for such preponderance, and to do it in simple ways, at lower cost.

Another object is a simpler design of actuator construction.

Another object iof the invention is to obtain a dependable flow by gravity of flowable material within the actuator, and to gain a longer time-period, and a more precise control of the period, for the flow by a given quantity of the material.

A related object is to avoid sluggishness, in the flow, that arises with water-vapor in the atmosphere, which may affect the flowable material by oxidation or otherwise.

And a further object is to gain the fullest practical advantage of weight in relation to volume in the flowable material, to afford optimum force of inertia under movement.

Another object of the invention is a simple design of shipper-button which holds with extensive surface-friction upon a cable used for transmitting the drive from motor to door. A button that is limited to surface-friction by the end-tips of set-screws does not have a comparable hold.

Another object is to guard against dust unduly entering a cabinet.

Another object of the invention is to maintain in the jointed-linkage that runs in the track, a continuing bias towards the vertical web-side of the track, to correct more fully than shown in my patent application "H," any tendency by the jointed linkage to escape from a track that is provided with a lateral flange for the roller-groove but no flange vertically at the upper enclosure on the open side of the track.

Another object is to provide a low cost arrangement for breaking the circuit that includes a cell at doorway-frame and a relay that provides for energizing a solenoid to effect motor-operation of the door; also a low-cost timing means for re-closing the cell-to-relay circuit after the expiration of a period of time; ensuring that within the time-period no actuation of the door could occur to bring the door down upon a car passing into the garage; or could occur to re-open a closed door while a car, having left the garage, was being maneuvered in the driveway for a course to be taken in leaving the garage.

These and minor objects will appear in the development of the description.

DRAWINGS

The accompanying drawings show for purposes of illustration, embodiments in which the invention may take form, but the invention is not limited to these embodiments.

FIG. 12 is an end-view of the formed link of FIG. 11 and of related parts.

FIG. 13 is a face view of motor-drive and shift-mechanism above the cabinet of FIG. 2 at rear end of track of FIG. 1.

ELECTRICAL ELEMENTS

Although any electric current may be adopted, if the devices are rated for it, the supply of electric current used is 110 volts alternating current, 60 cycle, generally known as "house-current," and for this several of the electrical devices are rated. The positive lead from the supply is through a circuit breaker 200, FIG. 1, thence through a lock-switch 201. From the lock-switch the current is distributed by conductor 159 to three devices: to motor 50, to relay 202, and to transformer 203. The conductors to the motor are to be observed under caption Reverser. The conductors at the transformer, and at the relay, are to be noted under caption SAFETY-TIMER.

Figure 1:
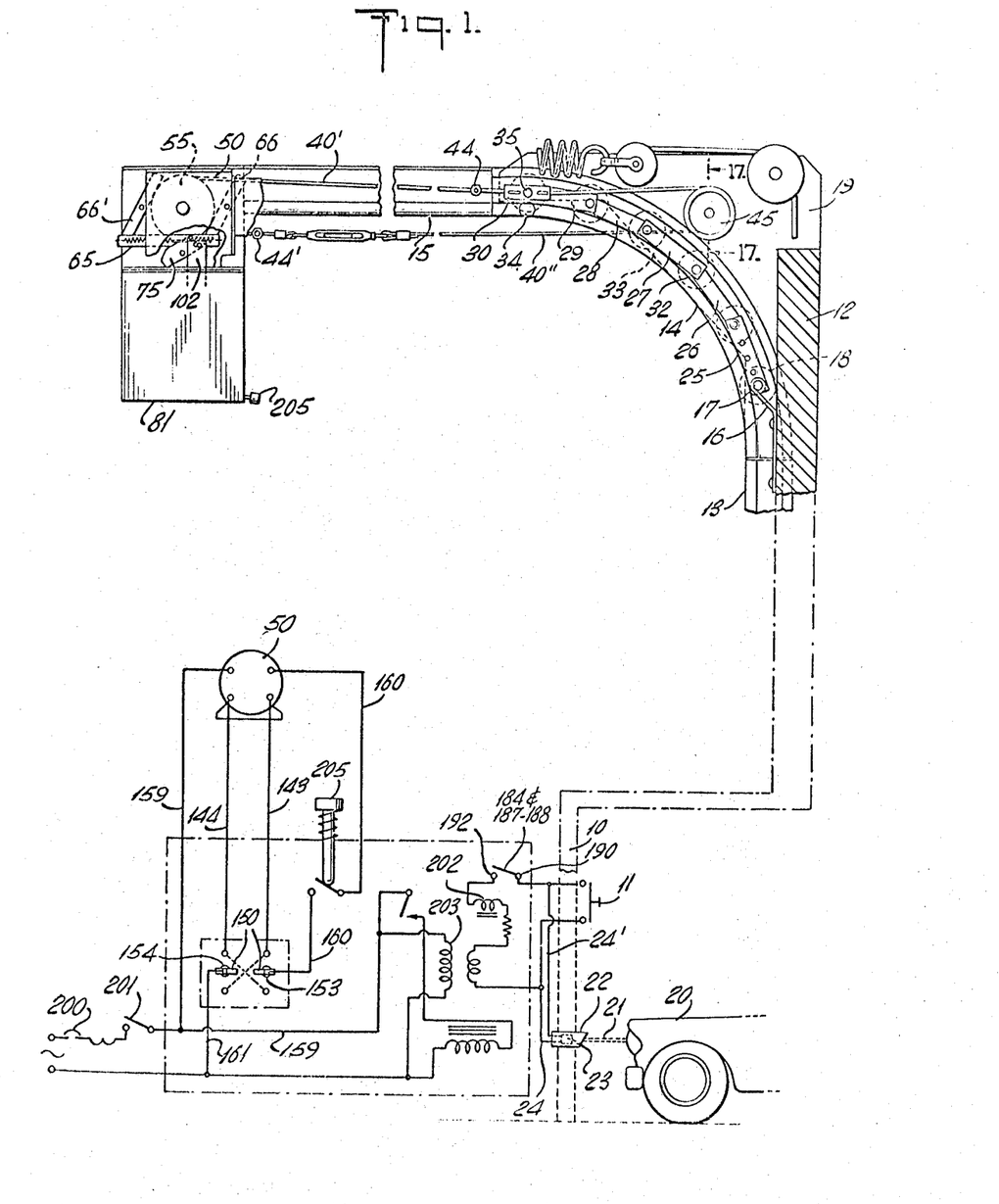
FIG. 1 is a diagrammatic face view of door-guide tracks at one side of garage, of door-operator devices in relative positions, and a wiring-diagram.

A capsule 22, FIG. 1, is mounted on one of the jambs of doorway frame 10 in position to receive headlamp-beam 21 from automobile 20. Cell 23, within the shell of capsule 22, is any semi-conductor, or solar-battery, or suitable combination of matter, through which electric current flows in the more volume as the volume of light-rays which reach it may be increased. The design and merits of capsule and cell are as described on pages 8 and 9 of my pending patent application "H."

Two conductor-wires 24 and 24' lead the electric current from transformer 203 to cell 23, and from cell 23, through safety-switch at 184, to relay 202.

DOOR-DRIVE AND SHIFT

The door 12, appears at FIG. 1 in closed position. The positions of parts in FIGS. 2, 3, 4, 13, and 14, are as with an open door. Door 12 is of a design used broadly, in several sections horizontally hinged together, moving from a vertical closed position upward to a horizontal open position, guided and supported by tracks that are vertical on each side of the doorway frame, such as 13, and are horizontal overhead inward of the garage, such as 15, and have curved sections such as 14 joining the vertical tracks to the horizontal tracks.

At or near the hinges which join the horizontal door-sections, brackets such as 16 carry pins such as 17 which pins extend sideward beyond the door's left and right edges, and constitute axles for rollers such as 18 which run in the tracks, either side of the doorway.

Within the horizontal and curved tracks is a jointed linkage of five links, three "outer" links 25, 27, and 29 of channel-section, embracing two narrower "inner" links 26 and 28 of channel-section; these links being joined outer to inner, pivotally, by pins such as 32. Within slots 26' and 27' (FIGS. 10 and 11) are rollers such as 33, FIG. 1, which run in the base-grooves of the tracks.

Figures 5, 6, 7, 8, 10, 11:
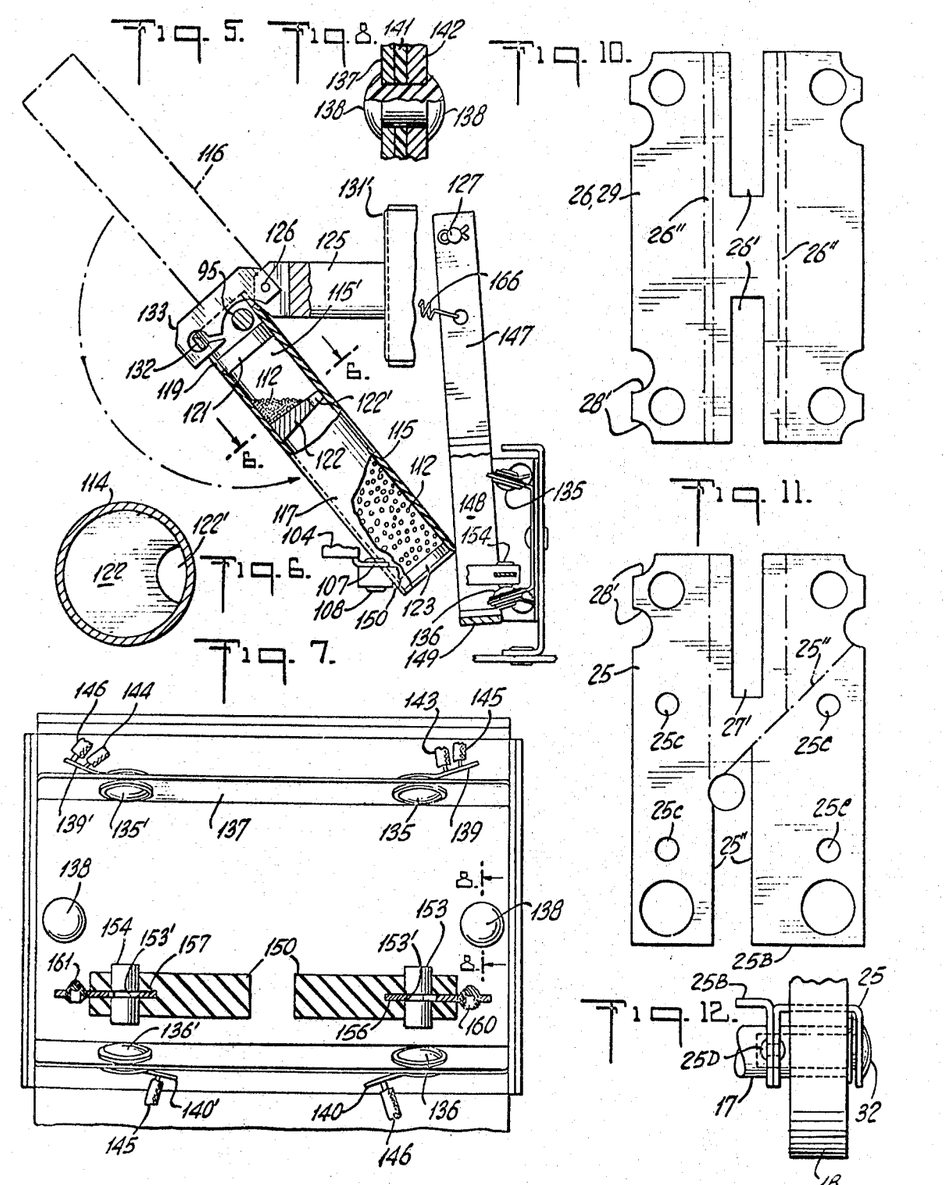
FIG. 5 is a face view of an actuator in two operating positions.
FIG. 6 is a sectional view of actuator tube and web therein, on lines 6—6 of FIG. 5.
FIG. 7 is a view of reversing switch on lines 7—7 of FIG. 2.
FIG. 8 is a section on lines 8—8 of FIG. 7.
FIG. 10 is an outline of a sheet-metal blank for a linkage-unit before forming into channel-shape.
FIG. 11 is an outline of a sheet-metal blank prior to forming into a door-attaching link.

FIG. 10 shows a flat sheet-metal blank for links 26, 27, 28, and 29, as punched before being bent into channel form. Of the pairs of broken lines 26" in FIG. 10 that parallel slots 26', the inner of each pair indicates the location of bend for narrower links 26 and 28; the outer of each pair indicates the location of bend of the wider links 27 and 29. FIG. 11 shows a flat door-end-blank for a link 25, which connects to the door at pin 17 in door-bracket 16. This end-blank becomes sheared along broken lines 25", and the severed flange 25B is brought over to the opposite flange, the two flanges being riveted together by rivets 25D, FIG. 12, through rivet-holes 25C, reinforced as a double-thick lug, slipped onto pin 17 through which the motor-drive is applied to the door. This door-end connection is alternative to the jaws 89 which appear in FIGS. 8, 9, and 10 of my pending patent application "H."

In FIGS. 10 and 11, half-circle or quarter-circle notches such as 28', provide for free articulation at pivots 32 whether the linkage is installed, as shown in FIG. 1, in what may be called the right-hand track of the garage, or is installed upside down in what may be called the left-hand track of the garage. The notches admit the webs of links adjoining.

On pin 35, at the leftward end of the jointed-linkage as viewed in FIG. 1, a detaching-lug 30 is retained by cotter 31, FIG. 13. To permit of manual operation of the door, cotter 31 may be drawn by finger-ring 34 out of pin 35, so that lug 30 may be slipped off. Detaching lug 30 has holes 30', FIG. 13, through which there is threaded, and mechanically side-pressed for tight grip, the upper strand 40' of cable 40. The cable 40, of upper strand 40' and lower strand 40", runs, similarly to an endless-belt, around grip-sheave 55 at motor, FIGS. 1 and 13, and around slanted-pulley 45, FIGS. 1 and 17, which pulley is mounted on a web 19' between curved track 14 and jamb-bracket 19, which bracket is bolted to the door-frame 10.

Figures 14, 15, 16, 17:
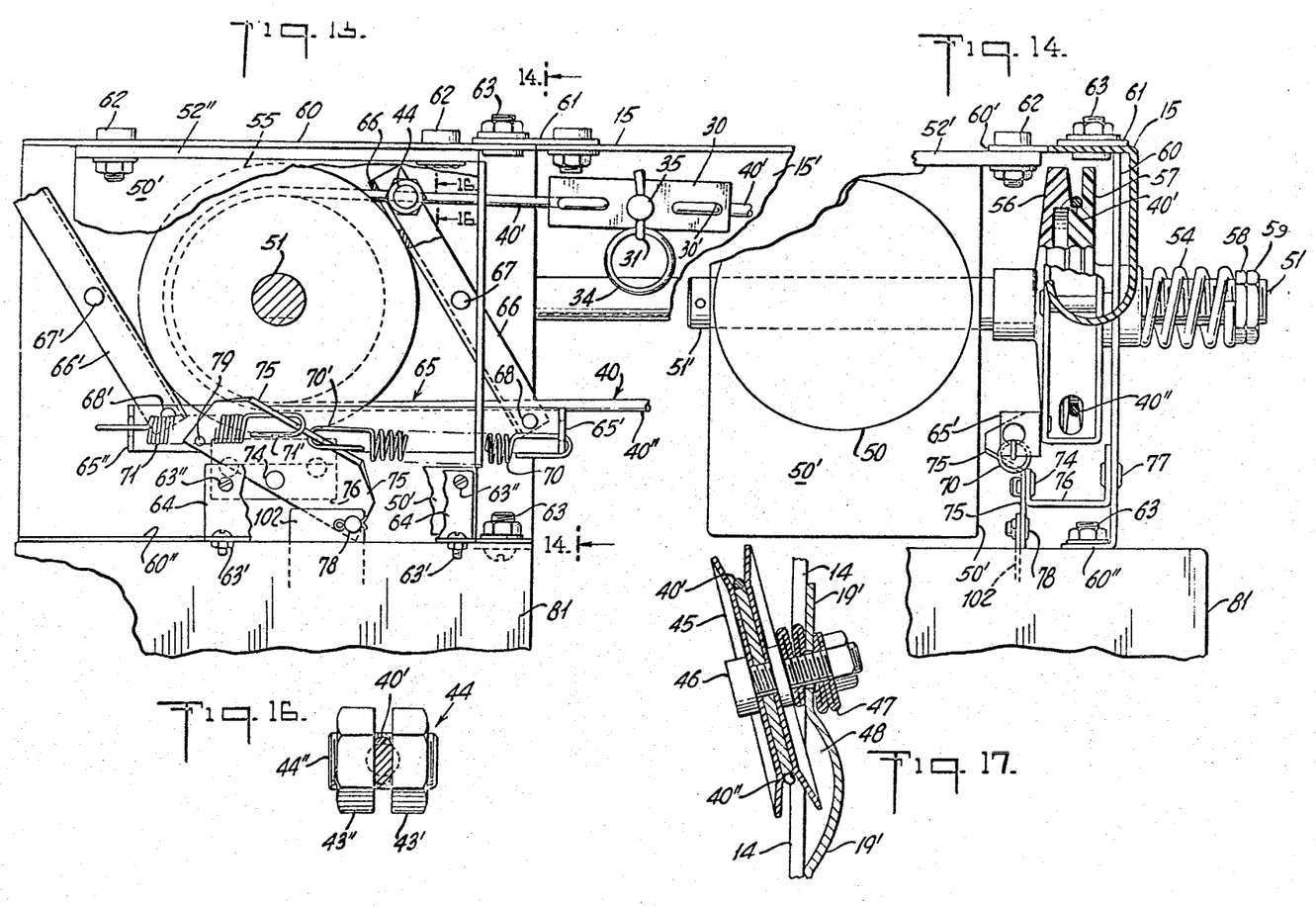
FIG. 14 is a side view of FIG. 13 with parts omitted for clarity.
FIG. 15 is a side view of an auxiliary drive.
FIG. 16 is a side-view of a shipper button.
FIG. 17 is a side-view of a slanted pulley.
Figure 15:
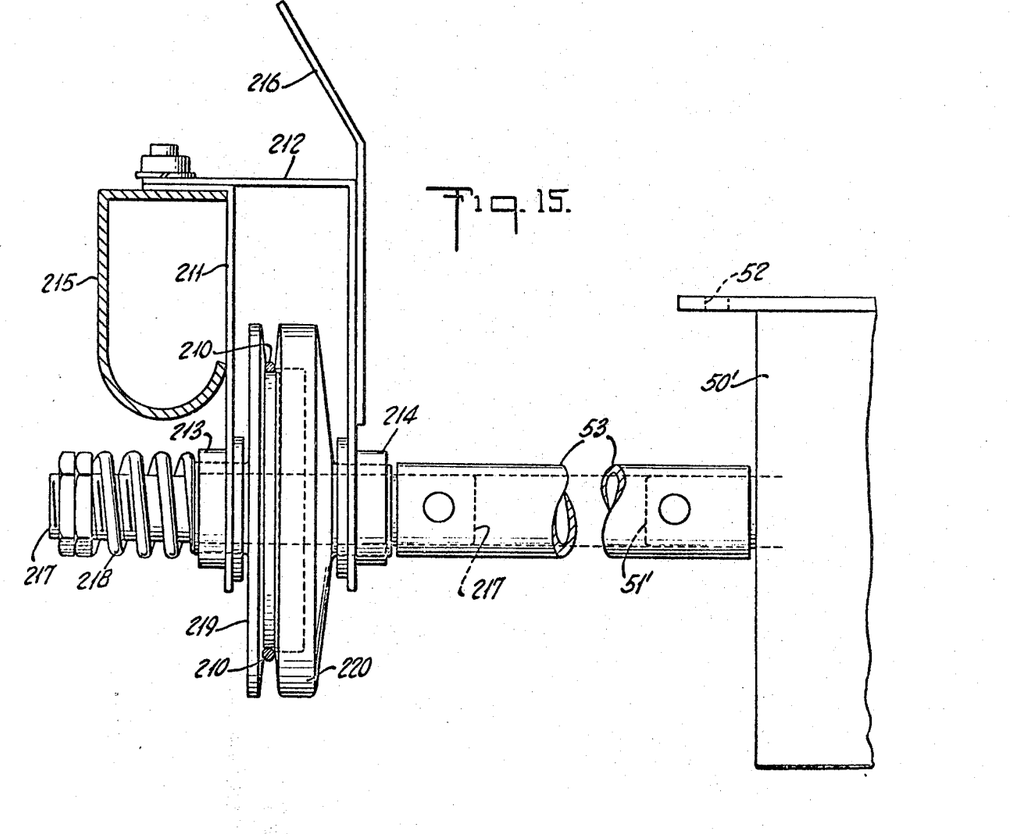

Mounting of slanted-pulley 45 (alternatively to that shown in my pending patent-application "H,") appears in FIG. 17. This mounting affords an economy in labor-time, in that is avoids the need for the installing-man to cut a sizeable opening out of the metal of web 19'. The slanted-pulley, by having less slant off-vertical, need not reach through the web 19'. The cable's lower strand 40" may get to the rearward side of track 14 through an aperture 48 obtained by driving a chisel between the rigid track 14 and the thin web 19'. To hold the pulley's pintle 46 on a lesser slant than appearing in application "H," four pieces of a sheet-metal pad 47 are put two either side of a pintle-hole drilled through web 19'.

FIGS. 13 and 14 show mechanism mounted at rear end of horizontal track 15, including door-drive motor 50 and motor-shaft 51, grip sheave 55 of nylon in two parts, a recessed disc 56, and a shouldered disc 57; also, on the threaded end of motor-shaft 51, a grip-spring 54 and two nuts, compression-nut 58 and lock-nut 59.

In a test I made at the laboratory-shop of Berry Door Corporation, Birmingham, Mich., I found that the tenuous strands of wire, that make up the best cable of stainless steel, broke and stripped from the cable, after about 5000 operations, when the material of the slip-grip sheave facings (under spring-pressure for frictional contact with the cable) were of metal, or of sintered oil-bearing metal; whereas, using resilient nylon in contact with the cable, no noticeable wear in the nylon, or failure in the cable, occurred through 25,000 operations, equivalent to 25 years at the average residence-garage.

An improved arrangement is obtained by setting the inverted motor-base rearward of the rear end of track 15, and locating a hanger 60 so that an edge of it butts against the end of track 15 and is so positioned for convenience installation by a cleat 61. Flange 52' of inverted motor-base is bolted to flange 60' of hanger by bolts 62 and 62'. The flange 52" of motor-base, frontward of FIG. 13, or appearing in FIG. 15, takes bolts that fasten braces or guy-rods to positions on the garage-structure.

The cabinet is supported by machine-screws 63 to a lower flange 60" of hanger, and by machine-screws 63' to an angle-piece 64 screwed at 63" to the front side of motor gear-box 50'.

Upon hanger 60 shifters 66 and 66' are supported pivotally by respective studs 67 and 67'; these shifters being interconnected by a trace 65 pivotally at respective cottered pivots 68 and 68'.

The ends 65' and 65" of trace, formed at right angles to the main length, have holes which receive loop-ends of respective shift-springs 70 and 71. These shift-springs at their respective inward loops 70' and 71' connect to rocker 75 which pivots at 74 to a shoe 76 riveted to hanger at 77, and connects pivotally at 78 to leaf 102 later noted. The end of rocker at hole 79 connects to leaf 102 when rocker and leaf 102, with the motor and the shift mechanism, are transferred to positions below the cabinet.

Figure 9:
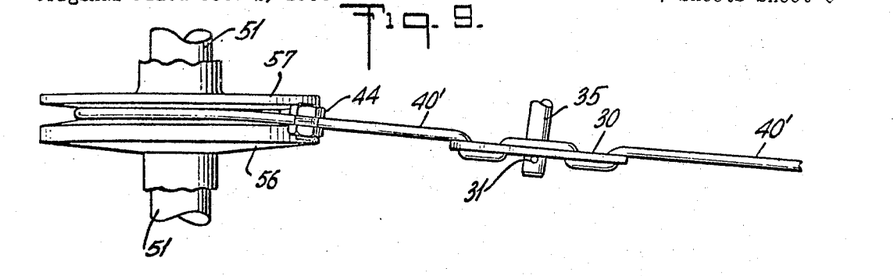
FIG. 9 is a diagrammatic view of a cable slanting from sheave to detaching-lug.

The gradual slant, FIG. 9, in the reach of strand 40' from detaching lug 30 to slip-grip sheave 55 is less acute the farther the lug 30 travels toward the doorway. Notwithstanding, there is a bias throughout, which keeps the jointed-linkage tending toward the vertical side-web 15' of the track and away from the track's open side.

In the designs that appear in my early patent applications the tendency has been outward through the open side of the track, and in my application "H" the tendency has been parallel with the track.

The tendency shown here, inward of the track towards the closed vertical side-web of the track, has been made possible by the arrangement in which the horizontal center line of motor-shaft may be positioned at, or higher than, the roller-groove part of the track, and yet be clear of the track, by having motor and shift assembly of FIGS. 13 and 14 set rearward of the rear-end of track.

In this design the tendency of the jointed linkage and its rollers 33 is to rise slightly out of contact with the track's groove, as the upper-strand is pulled by counterclockwise rotation of motor shaft 51 and grip-sheave 55, due to the slant being upward from the lug-pin 35 rearwardly to the groove of grip-sheave 55. Thus the linkage and its rollers 33 move free of friction with the track.

In my patent-application "H," it will be observed that pull by upper strand of cable is from a cable-groove in grip-sheave lower than the lug-pin in jointed-linkage, causing the cable to slant oppositely to the slant in this present application, and occasioning pressure and friction downward upon the track.

SHIPPER-BUTTON

Shipper-button 44, FIG. 16, on upper strand 40' of cable 40, and on lower strand 40", FIG. 1, is of a novel design which applies a frictional hold equally on both sides of the cable by nuts subject to tightening by wrenches on an exterior thread, rather than the less effective set-screw tightening into an interiorly threaded hole by a screw-driver having a relatively small blade. This shipper-button is less expensive to make, and of a lesser size, than as shown in my former patent applications, as in "H," and has a more positive hold on cable than that shown in my former designs. In manufacture, a threaded stud 44", FIG. 16, is drilled across the middle by a drill size suitable to the diameter of the cable; nuts 43' and 43" are put on both ends of the stud; at installation these nuts are tightened against the cable by wrenches to utilize extensive nut-surfaces for gaining an optimum of frictional hold up the cable.

AUXILIARY DRIVE FOR DOUBLED TRACTION

At a garage for two cars, having a single door of about 16-foot width, in smooth-running condition and well counterbalanced, a drive from the one "slip-grip" sheave 55 is adequate. But not infrequently a door is encountered at which tracks have been damaged by accident; or at which resistance to hand-operation occurs elsewhere at some spots in the door-movement; or at which the door sets itself at an angle, one end slightly higher than the other, setting up roller-friction, and jamb-friction; so that a greater traction by grip-sheave is needed, uniform at both sides of the doorway.

For such a door, a shaft is provided across the garage from the motor to a grip-sheave mounted at the rear end of the track that is parallel to, and oppositely across from, track 15 of FIG. 1.

Motor-shaft 51, of which a cross-section appears in FIG. 13, and a threaded end appears in FIG. 14, reaches through motor's gear-box 50' and (indicated 51') out beyond the face-end of gear-box.

In FIG. 15 a broken-away and fragmentary side view of the face-end of gear-box 50' appears, and with it the end 51'. Socketed and pinned upon end 51' is a cross-shaft 53 which extends across the garage to the door-guide track 215, where it is socketed and pinned to a shaft 217 having a diameter corresponding to shaft-end 51', and having the same "flat" for keying to grip-sheave. The grip-sheave is identical with sheave 55, being of nylon in two parts, a recessed disc 220, and a shouldered disc 219, pressed by spring 218 for frictional drive. A cable 210 identical with cable 40, (except that it carries no shipper-buttons corresponding to 44), provides a drive upon the door as with cable 40, similarly to an endless belt running around a slanted pulley (not appearing in FIG. 15) identical with pulley 45, and mounted in the same way; and cable 210 carries a detaching-lug connected to a joined-linkage which attaches to the door in the way shown and described for FIG. 1. Two brackets 211 and 212 are bolted to track 215 and these support the grip-sheave and associated parts. Bracket 211 embraces bearing 213 in which the hub of sheave-disc 219 turns; and bracket 212 embraces bearing 214 in which turns the hub of sheave-disc 220.

A strip 216 may be fastened to a hanger that, in usual practice, supports track 215 from the garage-ceiling, or it may be fastened to any suitable spot in the garage-structure.

CABINET-CONSTRUCTION

In the construction of the cabinet, an object has been to make the mechanism accessible at three directions of approach, from the front, from the right-hand side, and from the left-hand side. These sides are to be closed by a cover 85. Thus, three sides of the six-sided cabinet are in "housing" 81, comprising the top, the rear wall, and the floor. Upon this housing all interior parts are supported, there being nothing used mechanically that is fastened to or supported by the interior surfaces of the cover 85. The housing and the cover are made from two pieces of sheet metal of precisely the same dimensions when flat, an economy in tooling for forming and otherwise.

At right angles to the end-surfaces of these two sheet-metal pieces narrow "end-flanges" such as 82' and 82" are formed. One of these flanges 82' turns vertically downward from the top of the housing and the other 82" turns vertically upward from the floor. These have four corner holes 83 in which sheet-metal screws hold the front 85' of the cover. Corresponding flanges of the cover 86' and 86" FIG. 4 embrace the outside of the rear wall of cabinet. The forming of the cover is done to produce a slight bias of the side walls inwardly so that the flanges at the rear will spring over without fastenings. A notch 209, FIG. 4, punched in the bottom edge of cover, admits stem 206 of push-button 205. A feature of the construction is a dust-guard. The end-flanges 82' and 82", FIG. 3, are punched to afford narrow notches, such as 84, FIG. 2 upper right, and FIG. 4, one at each of the four corners. The breadth of the front 85' of the cover, FIG. 3, is formed to occupy the notches, and thus to bring the side walls under the edges 81' of the top, FIGS. 2 and 4, and above the corresponding edges of the floor; the overhang of these edges narrowing as the side walls reach toward the rear wall, on a slight slant appearing in FIG. 4. This overhang serves to guard against and minimize the entry of dust.

DEVICES WITHIN CABINET

A bolster 90 is fastened vertically within the cabinet by rivets 91' and 91" to ceiling and 92' and 92" to floor.

Figure 4:
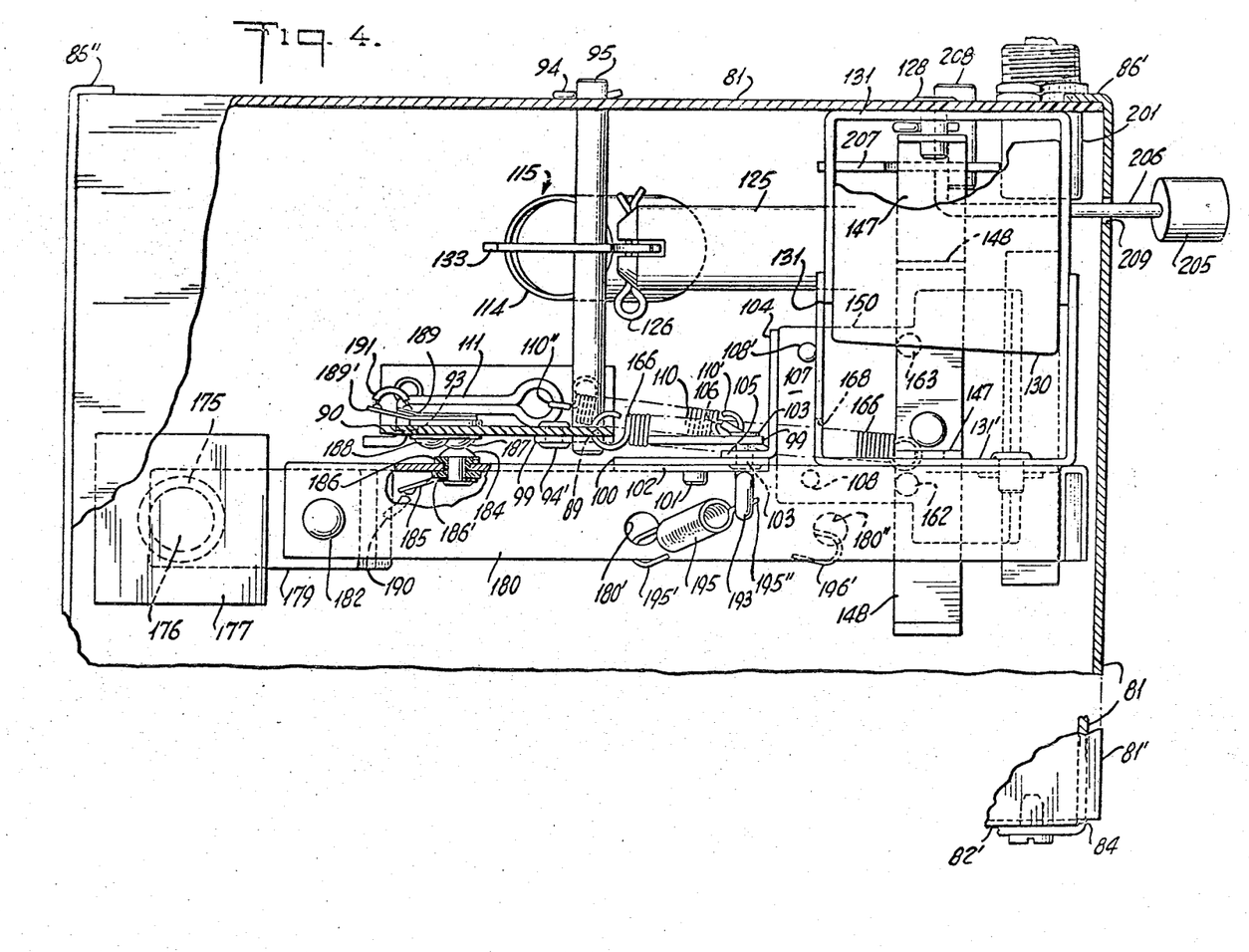
FIG. 4 is a plan view of FIG. 2.

A horizontal mid-rod 95, reaches from a hole in rear wall of cabinet to a hole in bolster and is confined by cotter-pins 94 and 94', FIG. 4. On mid-rod 95 an actuator 115 pivots, FIG. 5. This will be observed under the caption "Actuator."

Figure 2:
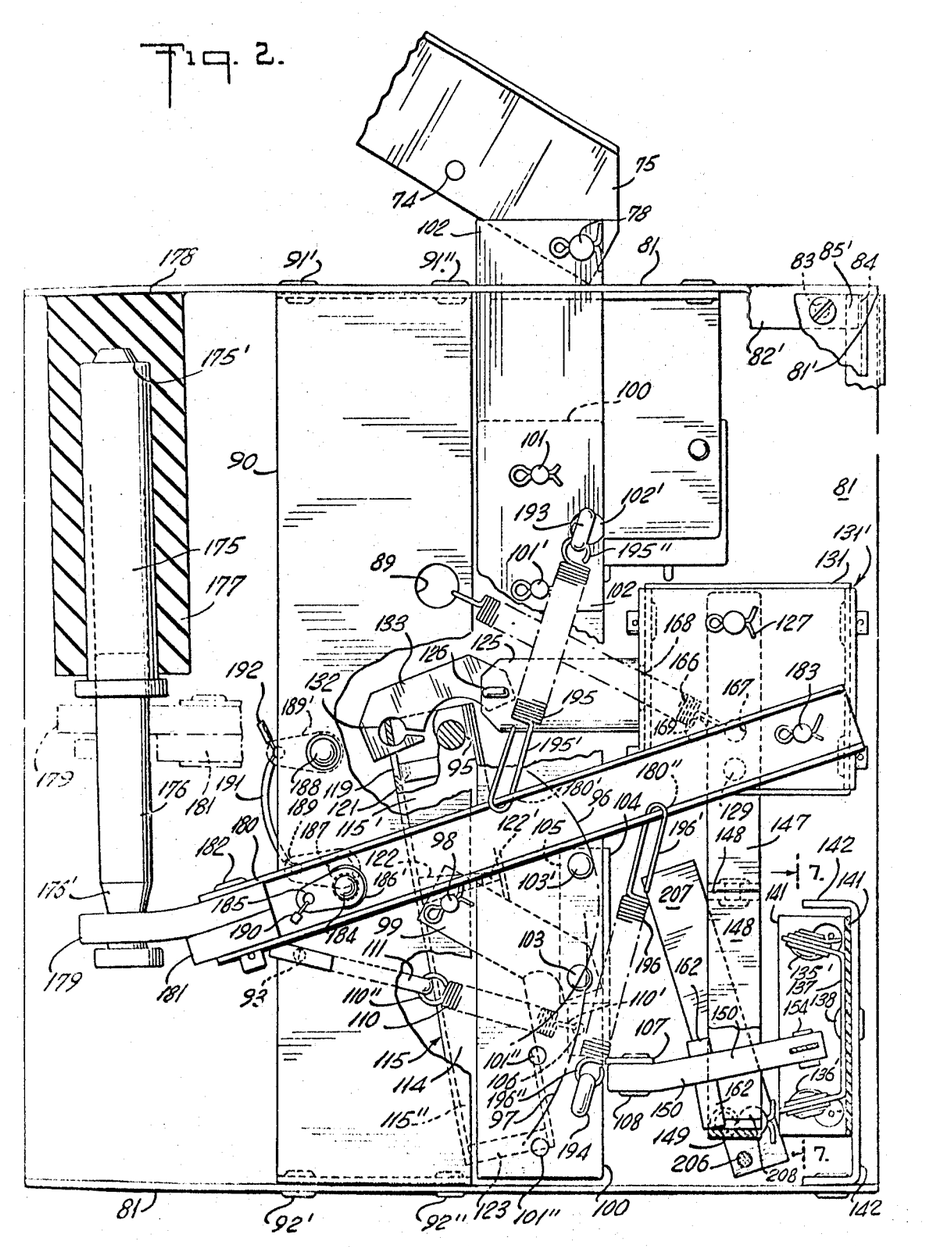
FIG. 2 is a face view of devices within a cabinet.
Figure 3:
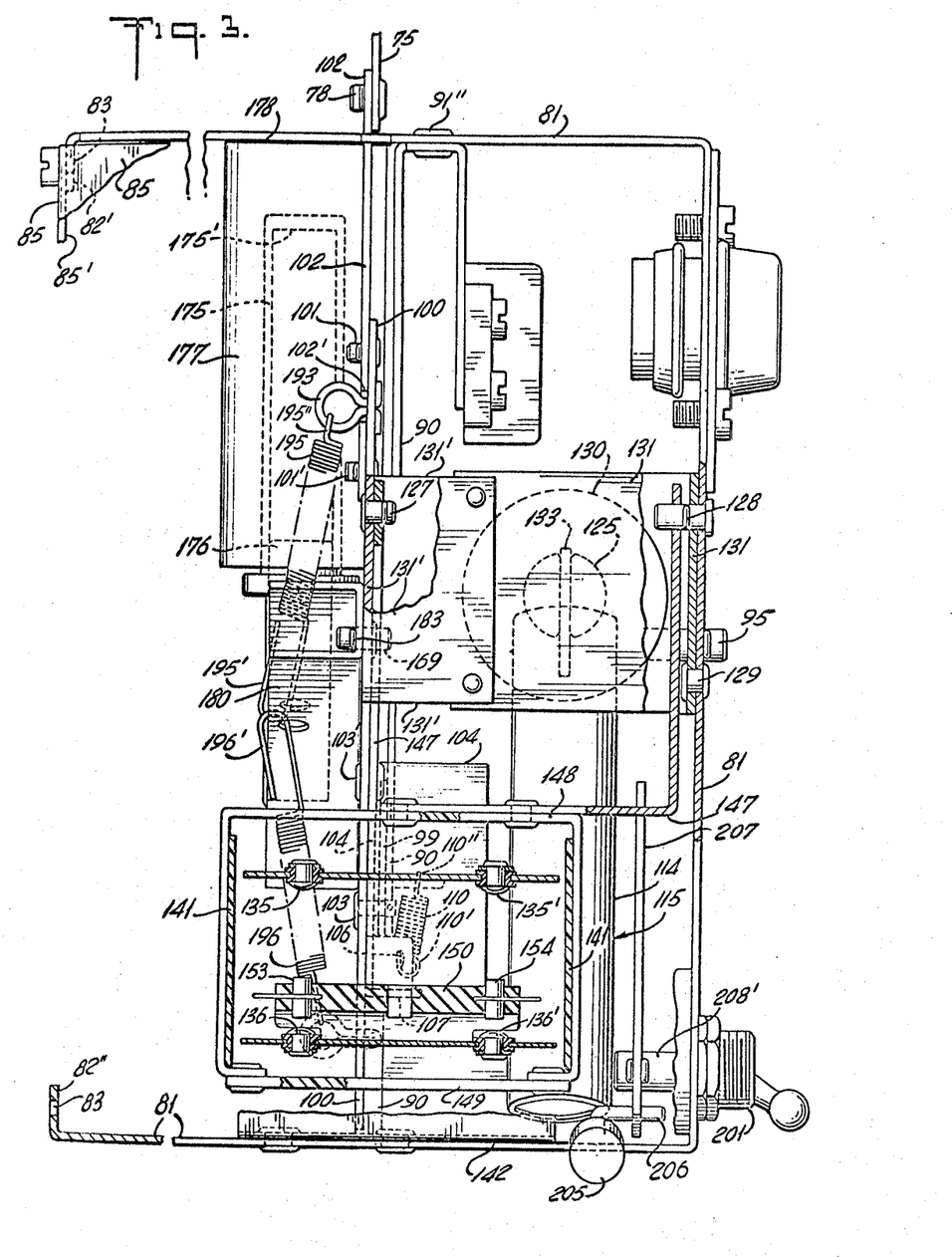
FIG. 3 is a side view of FIG. 2.

Leaf 102', FIG. 2, is connected by cottered pin 78 to rocker 75, and attached by cotter pins 101 and 101' to plate 100. Holes 101" at bottom end of plate 100 are for alternative attachment of leaf 102.

Leaf 102 and plate 100 could be integral in a single strip of sheet-metal, except for separability needed in turning motor and shift-mechanism upside-down (as if on motor-shaft 51 as an axis, counter-clockwise of FIG. 13); the level of motor-shaft must be close to the level of track for cable-drive. The "Detroiter" Door made by Berry Door Corporation at Brimingham, Mich., has tracks at the level of the top edge of door, needing no garage-headroom. A cabinet put below the motor-level and track-level would reach so low as to be in the way of person's heads. So the cabinet may be conveniently set above track-level and motor. But at doors having a curved track, as in FIG. 1, with horizontal track about a foot above level of doorway-lintel, the cabinet is set below the track and motor; push-button 205 readily within reach.

A limb 104, at its integral flange 105, FIG. 4, is fastened to plate 100, by a tight rivet 103', FIG. 2, and a cottered rivet 103. Limb 104 has an ear 106 integral; also a flange 107 integral; rivets 108 through flanges 107 hold a reverser 150 of rubber, observed under the caption "Reverser."

Cotter pins 193 and 194 have close fits in plate 100 and are cleared by notch 102' in leaf 102 in both alternative positions of leaf according to whether motor is set above or below the cabinet. The heads of these cotter pins receive eyes 195" and 196" of respective dash-springs 195 and 196, observed under the caption "Safety Timer."

A hitch 99 is pivotally connected between cottered pin 98 on bolster 90, and cottered pin 103 on plate 100. Dimension 98 to 103 corresponds with dimension 74 to 78 of rocker 75.

When cable-strand 40' moves its first fraction of an inch at the start of a door-closing movement. It takes shipper-button 44, FIG. 13, away from the upper end of shifter 66, enabling shift-spring 70 to relieve its tension and return to its normal length and to its counter-balance with shift-spring 71. In this condition shifters 66 and 66', shift-springs 70 and 71, trace 65, and rocker 75, would be under no restraint against a vertical dislodgement of plate 100, and possible drift of motor-reversing controls and other parts governed by plate 100, as might be induced by gravity upon plate 100, or upon parts attached to it, or as might be induced by vibration during the door-drive, when rollers holding the weight of door run in the horizontal track—except that a toggle is provided to hold plate 100 positively in its upward position when set there, and positively in its lowered position when set there. The toggle consists of toggle-spring 110, FIGS. 2 and 4, having its eye 110' at one end engaged into a hole in ear 106 of limb 104, and its eye 110" at its other end engaged into the head of cotter-pin 111 the shank of which, bent at a right-angle, pivots in hole 93 in bolster 90.

The level of hole 93 in bolster 90 is half way between the alternating upper and lower levels of ear 106. The movement of hitch 99 is through an arc 96 described by 103 from center of 98 in FIG. 2, the horizontal displacement of which arc, sidewise from the arc's vertical chord, is about 9/64 of an inch, midway. Since arc 97 of a radius centered at 93 and described at 106 produces a horiontal displacement roughly half that of arc 96, toggle spring 110, to follow arc 96, must stretch, and find its lesser tension at the upper and lower extremes of the up and down movement. At those extremes spring 110 approaches its normally contracted length and resists dislodgement upward or downward, and so tends to hold plate 100 and related parts from undue movement out of upper or lower positions into which these may be set.

ACTUATOR

Actuator 115, FIGS. 2, 5, and 6, is a round tube 114 of parallel walls, preferably of relatively light weight material, pivoted on mid-rod 95, closed at its pivoted end, the top end, by a plug 121, and closed at its bottom-end, the end normally the lower, by a plug 123; and having across its interior a web 122 which separates pivotal chamber 115' from hammer-chamber 115".

The flowable material which drains by gravity from chamber to chamber is in the form of globules of lead the values in which are about to be observed.

Web 122 has a drain-notch 122', FIGS. 2, 5, and 6, punched from its periphery, through which notch the lead-globules pass.

This notch 122', by location at the periphery of the web, ensures the full drainage of lead globules from chamber 115" to chamber 115', of value in obtaining maximum differential in force of inertia as between a charged hammer-chamber 115" and an empty chamber. In designs shown in my earlier patents and patent-applications, some of the content of flowable material was trapped in pockets adjacent to a centered neck unless the actuator-tube could be held in fully vertical position and that position was difficult to attain, at the up-swing, by a solenoid of practical strength, also, in such a position, jamming of the flowable material occured due to the weight of the pack above.

Ordinarily, after the actuating swing-through, the tube 114 recedes by gravity to hang in the almost vertical position appearing in FIG. 2. In this position, globules that have entered chamber 115' return by gravity to chamber 115".

The longitudinal dimension of pivotal chamber and that of hammer chamber are subject to change according to position of web 122. The optimum of advantage in the setting of web 122 is established in a shop-fixture to position and hold the web by friction.

The frame 131 of a solenoid 130, is held to housing 81 by cottered pin 128 and a rivet 129, FIG. 3. To frame 131 a cap 131' is riveted. The solenoid-plunger 125 is connected by cotter-pin 126 to a pitman 133, a hole 132 of which pitman connects to the top-end metal of actuator, this top end having below it for accessibility of pitman metal, a hole 119, FIGS. 2 and 5. A pull by solenoid-plunger 125 effected through pitman 133 upon actuator 115 raises the actuator to an upper position 116, FIG. 5, in which lead-globules may drain by gravity from the hammer-chamber 115" into the pivoted chamber 115'.

If this raising of the actuator occurs intentionally to obtain an operation of the door, the energization of the solenoid will be for a momentary period of one or two seconds, so that the actuator will drop with its charge of lead-globules little depleted, and it will swing downward and rightward through a distance which, as at 117 of FIG. 5, will dislodge a hold by an enclosure, described under caption REVERSER, to close a power circuit to door-drive motor to operate the door. But if the elevated position of actuator is held for a sustained period, as by rays of the sun from the horizon, the drainage of lead-globules into the pivoted chamber will deprive the hammer-chamber of force of inertia sufficient to dislodge the enclosure, thus door-actuation will not be obtained.

This two-chambered device appears first in my patent "C." Developments have appeared in my patent applications "D" and "H."

The design here shown has improvements as follows:

(I) Economy of manufacture in the use of a tube of parallel sides throughout.

(II) Increase in differential as between an adequately filled hammer-chamber and an empty hammer-chamber by reason of:

(a) Using a tube of relatively light-weight material.

(b) Using a flowable material of relatively high specific gravity.

(c) Adjustability in position of web across the tube, to confine flowable material close to pivot 95 once it has been drained into chamber 115' at position 116, the closer the greater the differential.

(d) Locating of drain-notch at periphery of web 122 to obtain full drainage at angular position 116 short of vertical.

(e) Adaptability, according to contracted length and wound strength of spring 166, in resistance at the termination of down-swing by actuator.

(III) Prevention of escape by plunger 125 of solenoid; by the introduction of a rigid pitman 133 between plunger and actuator, preventing outward movement by plunger beyond a safe nesting within core of solenoid.

GLOBULES OF LEAD

Globule of lead 112, within the actuator tube, are, as noted, the flowable material that drains from chamber to chamber. These lead-globules, produced by precipitation of molten lead, during which the lead before cooling takes the form of practically perfect spheres, are of a uniform diameter obtained by sifting.

The copper fragments chopped from copper wire, as described in my patent-application "H" have irregularities and tenuous threads that, on occasion, bridge across the flow-passageway between chambers of the actuator, so as to impede the flow, adversely affecting dependability.

Advantages of lead-globules within the actuator are:

(a) Dependability of flow inherent in spherical particles.
(b) Absence of oxidation that in some materials arises from presence of water-vapor.
(c) Non-adhesion of globules to each other due to dampness.
(d) Absence of need to bake the material to remove dampness.
(e) Absence of need to protect the material in an airtight container.
(f) Non-magnetization that would cause globules of a material such as steel to adhere in clusters.
(g) High specific gravity among materials of low cost.
(h) Close packing of spherical particles, affording greater mass in relation to space within a hammer-chamber.
(i) Precision in rate of flow by globules of uniform size.
(j) Susceptibility to precise time-control in a given volume.

REVERSER

The reverser 150 is made of pure gum rubber, unchanged by ingredients such as are useful to provide properties not needed for the purposes here described. Pure gum rubber will retain its flexibility and resilience through a longer period of years than will rubber containing admixtures.

Reverser 150 is fastened at one end by rivets 108 to the bottom of flange 107 of limb 104. Its flexibility permits of its acting as if having a hinge to flange 107. Reverser 150 has, passing through its free end, FIGS. 2, 3, and 7, two electrodes 153 and 154 of silver; these extend above and below the flat top and bottom surfaces of the reverser-rubber. The dielectric character of rubber permits of its acting as a shield in connecting an electric wire to each of the two electrodes 153 and 154. Pockets, slightly short of the respective outlines of soldering lugs 156 and 157, FIG. 7, are cut into the rubber from each of the opposite sidewise edges near the free end of the rubber. The knife in the fixture which makes the cut is controlled as to the depth of cut by a stop, so that an end of a soldering-lug 156 or 157 (having a hole in it through which an electrode 153 or 154 is to pass) must press the rubber to yield beyond the depth of the pocket. Each electrode has a groove 153', FIG. 7, machined around it, into which snaps an edge of the hole in lug 156 or 157, as the electrode is put through the rubber. The yielding and resilience inherent in the rubber effects a continuing pressure by lug 156 or 157 against electrode 153 or 154, ensuring a firm contact lug-to-silver for an adequate flow of current, and locking the electrode against escape from the reverser 150.

Each lug 156 and 157 has an additional hole where the lug projects out from the edge of the reverser-rubber; this hole takes the electric wire for the soldering operation. Conductor-wires 160 and 161, soldered to respective lugs 156 and 157 are highly flexible to apply a minimum of restraint to free movement of reverser-rubber in the inherent tendency of the rubber to straighten. Conductor-wire 160 is one of the control wires from the motor, FIG. 1. The other conductor-wire 161, soldered to lug 157 leads directly to the neutral side of the supply-line, FIG. 1. Conductor wires 160 and 161 come to the reverser-rubber where the rubber is attached to flange 107 of limb 104. Here they are strapped by friction-tape put around rubber and flange as these wires turn at an angle to lie along respective edges of the rubber.

Electrodes 153 and 154 are arranged for making electrical contacts with respective electrodes 135 and 135', above them, FIG. 7, and for making alternative electrical contacts with respective electrodes 136 and 136' below them. Electrodes 135 and 135' of silver, have respective contact-heads downward and have respective shanks upward through the upper flange of a holder 137, and through respective soldering lugs 139 and 139'; each silver shank being riveted (upset) to hold its respective lug 139 or 139'. Conversely, contact-heads of electrodes 136 and 136' are upward for contact with respective electrodes 153 and 154, and their shanks, together with soldering lugs 140 and 140', are downward through the lower flange of holder 137. Each electrode 135, 135', 136, 136' is insulated from holder 137 by a plastic sleeve around its shank, and by mica washers under the contact-head, and between holder 137 and its respective soldering lug 139, 139', 140, or 140'. Holder 137 is supported by bracket 142, riveted to floor of cabinet. Holder 137 and wiring and soldering-lug connections are insulated from bracket 142 by a fiber sheet 141 and by nylon rivets 138 (set up under heat) as appearing in FIG. 8.

To the lug 139, FIG. 7, at upper right of holder 137, there is soldered a conductor 143 from motor which, for convenience, may be regarded as having a polarity to effect a rotation of motor-shaft 51 and sheave-wheel 55 counter-clockwise as viewed in FIG. 1 to open the door. To this same lug 139 a conductor 145 is soldered, running to the lug 140' at lower left of the enclosure.

Conversely there is soldered to the lug 139' at upper left of holder 137, FIG. 7, a conductor 144 from motor, regarded as having a polarity to effect a clockwise rotation of motor to close the door. To the same lug 139' a conductor 146 is soldered, running to the lug 140 at lower right of the enclosure.

A trapeze 147, pivotally depending from cottered pins 128 and 127 at the upper ridges of solenoid frame 131 and of solenoid-cap 131' respectively (cottered pin 128 extending to carry the trapeze), has a clevis 148 riveted to trapeze, clevis 148 forming upper and side boundaries of an enclosure, and having two bottom end flanges, one at each side, by which it is riveted to a fiber strip 149 forming the lower boundary of the enclosure.

An extension spring 166, FIGS. 2 and 4, attached to the trapeze in a hole 167, passes through a freeway-hole 168 in solenoid-cap 131', and attaches to bolster 90 at hole 89. Spring 166 applies a pull to keep the clevis-enclosure tending leftward of FIG. 2 against stop 169.

Pressed through holes in the rubber of reverser 150 and cemented to the rubber after adjustment, are two arrestors 162 and 163, FIGS. 2 and 4, in the form of billets cut from round rod of any suitable material. The lower reach by these arrestors is greater than the upper: fiber strip 149, upon which the arrestors lodge as the downward movement of reverser approaches its low position, is set low enough to swing under the wire connections of soldering lugs 140 and 140'.

Being firmly held to flange 107 of limb 104, the reverser 150 moves upward and downward with the limb. As viewed in FIG. 2, the reverser 150 in its downward travel towards the end of the door-opening movement, has brought arrestors 162 and 163 to rest on fiberstrip 149. At this position arrestors 162 and 163 prevent electrodes 153 and 154 from making contacts with electrodes 136 and 136'. The door will not be again driven by motor while this hold of reverser by arrestors continues. When the actuator as in FIG. 5 reachess clevis 148 (rightward side of clevis enclosure FIG. 3) with force of inertia required to move the fiber-strip 149 out from under arrestors 162 and 163, the reverser 150 will straighten further to bring the electrodes 153 and 154 into contact with electrodes 136 and 136' and set the motor into rotation clockwise of the view in FIGS. 1 and 13 to close the door.

As the door approaches closed position, the circuit in the supply of energy to the motor is broken in the lifting of reverser's contact-points 153 and 154 away from contacts 136 and 136' on holder 137. This break of the motor-circuit stops the motor. As noted under Operation, the door coasts to closed position, and lifts leaf 105, trunk 100, limb 104, and reverser 150, bringing reverser upward until its arrestors 162 and 163 come to rest against the upper horizontal part of clevis 148. There the reverser remains, poised to almost straighten itself in bringing its electrodes 153 and 154 into contact with electrodes 135 and 135', of polarity counter to that of the electrodes from which it has been withdrawn, so that when such contact occurs the rotation of motor will be in counter-clockwise direction, as viewed in FIGS. 1 and 13, to open the door.

It is to be noted, FIG. 2, that the squared ends of arrestors 162 and 163 slant with the reverser-rubber to which they are attached. These slants, at both upward and downward positions of the reverser, are such that when fiber-strip 149, or clevis 148 of the enclosure, is moved rightward of FIG. 2 the slants ease the move rather than impede it. This contributes to one object of the invention, to provide that disengagement of the enclosure will respond to a gentle impulse by the actuator.

The values of rubber, or of plastic or other material having similar properties, in a device for reversing the rotation of a motor, may be summarized:

(I) Of the two electrodes carried by the rubber, each is independent of the other to the extent that, after one of the electrodes has made its contact with the electrode facing it, the other electrode is, in the inherent urge of the rubber to straighten, continued in movement to meet the electrode facing it, in order to complete the closing of the circuit.

If the electrodes were carried by a rigid member, having perhaps a hinge at the position of flange 107, the rigidity could prevent the closing of the circuit by one of the electrodes after the other had closed, unless the device were made with precision. Precision is both expensive and vulnerable. The slightest inaccuracy, or looseness in construction, could prevent the closing of the circuit.

(II) Rubber being itself a dielectric, insulating is saved in a number of places.

(III) Rubber may be positioned and held, short of its normal straightened condition, and, when released, will itself make a further move without need of extraneous devices such as cams or springs.

SAFETY-TIMER

A means for breaking the circuit of which the cell 23 is a part, meets conditions such as might cause a premature closing of an opened door which could occur when an automobile was passing through the doorway; or might cause a premature opening of a closed door which could occur when an automobile having left the garage, and having closed the door by its headlamp beam, was maneuvering in the driveway. The driver of the automobile, returning to the garage in darkness would, in approaching the door, bring the headlamp-beam to bear upon the capsule, and then extinguish the beam. This would cause the door to open. Upon the door having opened, the driver could light the headlamp-beam and steer the automobile towards the doorway, thus withdrawing the headlamp-beam from the capsule at doorway-frame. These two actions by the driver: (1) reapplying the headlamp-beam at the capsule, (2) withdrawing the beam, would set the door into its next movement—to close, while the automobile was passing through the doorway.

A break, for safety, in the circuit of which the cell is a part, to last for a period of time after each opening or closing of the door, is provided by a safety-timing switch between contact 184, FIGS. 1 and 2, and contacts 187 and 188 about to be observed.

A cylinder 175 closed at one end, as at 175', and open at its other end to admit a solid plunger 176, is used as a timing-device in which escape or intake of air occurs along a scant passageway, a space, less than a thousandth of an inch, that lies between the interior of the cylinder walls and the exterior of the plunger body. The cylinder and plunger are of glass ground to this close fit, unlubricated since lubrication may harden in cold weather, but, in delicate timing-work, capable of 50,000 operations, equivalent to 50 years wear at the average residence-garage. The cylinder is protected by a sleeve 177 of soft foam-rubber, into which it is cemented; and the sleeve 177 is cemented at 178 to the ceiling of the cabinet. The soft rubber, in its flexibility, permits cylinder 175 to swing in any direction, avoiding the provision of further pivotal means. A neck 176' on the lower end of plunger 176 provides for attachment of a flexible rubber tongue 179 which, with a filler 181, is held by cottered-pin 182 to the end of a channel-shaped arm 180 of sheet-metal, pivoted on solenoid cap 131' by a cottered rivet 183. Rubber tongue 179 transmits a flexible drive movement to plunger 176, On arm 180 is a contact-point 184 of silver, and a soldering lug 185, these being insulated electrically from the arm 180 by a plastic sleeve around the contact's stem, and, by mica washers 186 and 186' respectively, put under the contact's head, and put between the metal of arm 180 and of lug 185 before upsetting stem to hold lug 185. Two silver contact-points 187 and 188, and respective soldering lugs 189 and 189', are similarly insulated from and mounted upon bolster 90, these two being connected by an insulated jumper-wire 191, so that either of these, upon coming into contact with the contact-point 184 on arm 180, will have the same effect, closing the circuit from cell 23 to relay 202 through conductor 190 soldered to lug 185, and through conductor 192 on lug 189'.

Through holes 180' and 180'' in arm 180 there extend looped ends 195' and 196' of two springs 195 and 196, normally counterbalanced, and the eyes 195'' and 196'' of these engage in heads of respective cotter-pins 193 and 194, attached to plate 100. Springs 195 and 196 contract to normal after a period of time following the upward movement of plate 100 at termination of door's movement closing, and after a period of time following the downward movement of plate at termination of door's movement in opening; they remain in counter-balance thereafter to hold silver contact point 184 in contact with one or other of silver contact points 187 and 188 on bolster 90.

When plate 100 rises by, say, an inch, the upper spring 195 stretches, while the lower spring 196, rising the same inch with plate 100, slips on its loop 196' into the channel of arm 180. Toward the end of the inch-rise of plate 100, the stretch of the upper spring 195 is lifting arm 180 somewhat (against lightly compressed air in cylinder 175), so the loop of lower spring 196 does not need to be a full inch in length. As compression of air in cylinder becomes greater, so that arm 180 and plunger 176 move the more slowly under pull by upper spring 195, the loop in lower spring 196 approaches more and more to a position parallel with arm 180, not finding the relatively narrow channel within arm 180 a restriction.

Holes 180' and 180" are at differing distances from pivot 183. Upper spring 195 is opposed by gravity in lifting arm 180 and plunger 176; the lower spring 196 is helped by the weight of arm and plunger. So the upper spring 195 is given a longer leverage, farther from pivot 183. The lower spring 196, under-favored by length of leverage, moves arm 180 the more slowly, giving a longer safety time-period. A longer time-period is the more valuable when door is open, and when another car, following behind in the driveway, could bring the door down upon the owner's car as it should be passing through the doorway. A premature closing of door can be of more concern than a premature re-opening.

PUSH-BUTTONS

A push-button 11 on door-frame 10, or a lock in place of it, closes the circuit of conductor 24 from transformer 203 to cell 23, and of conductor 24' from cell 23 to relay 202, to obtain the same result as noted under Operation for the application of the headlamp-beam to cell 23.

A push-button 205 at cabinet 80, FIGS. 3 and 4, has its stem 206 engaged into a hole in lever 207, this lever 207 being pivoted on a stud 208 held in housing 81. Finger-pressure on the button leftward of FIGS. 2 and 4 causes lever 207 to move trapeze 147, clevis 148, and fiber-strip 149, rightward of FIG. 2 and so to dislodge fiber-strip 149 to free the reverser to bring its electrodes 153 and 154, in the direction in which the reverser rubber is biased at the time, into contact with respective electrodes 136 and 136' to close the door, or into contact with respective electrodes 135 and 135' to open the door.

OPERATION

In FIGS. 2, 3, and 4 the several parts of the door-operator are in positions as when the door is open. When headlamp-beam is brought to bear upon cell 23 in capsule 22 at doorway-jamb 10, passage of current through the cell from secondary winding of transformer 203 increases to such extent as to energize the coil of relay 202 to close the secondary circuit of house-current at relay 202, and bring house current to solenoid 130, energizing the solenoid coil to draw solenoid-plunger 125, and pitman 133 with it, rightward of FIGS. 1 and 2, elevating actuator 115 to position 116, FIG. 5. In this position lead-globules begin to drain from elevated hammer-chamber 115" through notch 122' in web 122 into pivoted chamber 115'. But if the headlamp-beam is extinguished or withdrawn promptly, as within a second or two, the drainage is arrested by the de-energization of the core-winding at relay 202 and at solenoid 130, freeing plunger 125 to slide outward of the solenoid core and permit a downward swing of actuator.

But if the elevation of actuator to position 116 has been caused by rays of the sun reaching the cell 23 for horizontally as in morning or evening, the application of light will be for a period longer than a second or two, sufficient to drain the lead-globules from the hammer-chamber 115" and to deprive the hammer-chamber of force of inertia sufficient to actuate the door in the course next to be observed.

The downward-swinging actuator, having its hammer-chamber charged with lead-globules, has a force of inertia under gravity and motion that brings it through to position 117, FIG. 5, where, against resistance by spring 166, it has made contact with clevis 148, and dislodged fiber-strip 149 to escape from its support of reverser 150 at arrestors 162 and 163, enabling reverser-rubber to straighten of its inherent bias into a lesser bend and far enough to bring electrodes 153 and 154 both into contact with respective electrodes 136 and 136', thus closing the circuits from and to motor to cause motor 50 and grip sheave 55 to rotate clockwise and close the door.

As the door approaches within about an inch and three-quarters of closed position, button 44' on strand 40" comes into contact with the lower end of shifter 66, and moves shifter 66, from its position appearing in FIG. 13, leftward of FIG. 13, and into its position appearing in FIG. 1, taking with it trace 65 and shift-spring 70 and 71. Spring 71 pulls rocker 75 to lift leaf 102, plate 100, and limb 104, and with them reverser 150, causing reverser to lift electrodes 153 and 154 away from electrodes 136 and 136', and to carry arrestors 162 and 163 clear of fiber-strip 149, thus opening the circuit to motor 50, stopping the motor, and permitting spring 166 to retract trapeze 147, clevis 148, and fiber-strip 149, leftward of FIG. 2 into vertical against stop 169. The door coasts under its momentum into fully closed position, stretching shift-spring 71, and causing it to complete the lift of plate 100, and to bring arrestors 162 and 163 to bear under the horizontal top of clevis 148, thus holding reverser electrodes 153 and 154 poised to make contact with respective electrodes 135 and 135' when, at the time for reopening door, actuator swings again to downward position 117, and dislodges clevis 148 from arrestors 162 and 163, freeing reverser 150 to make the upward contact against electrodes 135 and 135', for counter-clockwise rotation of motor, to open the door.

Operation of accessory elements has been set forth concurrently with the description of these.

What is claimed is:

1. In a door-operator for a door that is guided and supported by tracks that have a longitudinal opening along one side, and that have bottom grooves for rollers that run in the tracks, and have axle-pins for the rollers held by brackets attached to the door: a door-drive motor, and drive connections from motor to door which drive connections include a link for pivotal attachment to one of said axle-pins, said link having two-sided flange rigidity at its end that is the farther from the door, and one-sided reach, double reniforced, at its door-attachment end, for pivotal engagement upon the said one axle-pin alongside the door-carrying roller for that pin.

2. A construction according to claim 1 in which the door that is guided and supported by tracks open along one side and closed on the other side, and are held to respective jambs of the doorway frame by brackets having webs fastened to the tracks; and includes a door-drive motor, a motor-shaft and a door-drive sheave on the shaft, a slanted pulley on an aforementioned web, a cable in endless belt arrangement around said sheave and said pulley, connections from one strand of said cable to said door on the open side of the track, and a cable-freeway for bringing the other strand of said cable around said slanted pulley to the closed side of said track for avoiding entanglement with roller pins and other pieces, said freeway being obtained by making an aperture between said web and said track.

3. In an operator for a garage-door that is movable from a vertical closed position upward to a horizontal open position, and has a horizontal support-track each side of doorway parallel to side walls of garage, said track having an open side towards the door and a closed side towards the adjacent wall of garage: a door-driving motor and frame butted against the rear end (the end farther from the doorway) of one support-track, drive connections between said motor and said door including a driving-sheave on motor-shaft, a pulley adjacent to the doorway jamb, a cable in the fashion of an endless belt around said driving sheave and said pulley, a linkage connecting between said cable and said door and attaching means for positioning said motor and driving-sheave for slanting said cable the closer to the closed side of said track the more said linkage connection travels towards the rear end of said track, for inclining said linkage away from escape through the open side of the track.

4. Construction according to claim 3 in which driving-sheave is made of nylon having density, resilience and durability properties, to afford long wear of cable and sheave.

5. The arrangement of claim 4 in which said driving-sheave comprises two discs with hubs slidably keyed to the shaft, a first disc having an annular shoulder upon which said cable bears, and a second disc having an annular recess for receiving the said shoulder of said first disc, bevel faces on each disc slanting outward from the shoulder on said first disc, and slanting outward from the recess on said second disc, for affording free entry and exit by the said cable from the V-shaped groove formed by said faces in juxtaposition, and a spring pressing said discs together for producing a frictional grip upon the cable.

6. Construction according to claim 5 which includes an auxilliary drive for applying supplementary frictional transmission of said drive by said motor, said auxiliary drive comprising a shaft socketed from said motor shaft and extending across the garage to a drive-sheave and support-mounting at the rear end of the opposite track, and comprising members that correspond to and duplicate door-driving members aforementioned, including drive-sheave cable, pulley, and door-drive connections.

7. In a door-operator in which a door-drive is made by cable, a shipper-button on the cable comprising a threaded stud with a hole through the middle crosswise of the thread, and a nut on each side of the cable turnable on the thread for holding frictionally against the cable.

References Cited

UNITED STATES PATENTS

| | | | |
|---|---|---|---|
| 2,126,118 | 8/1938 | Kelley | 212—86 X |
| 2,758,836 | 8/1956 | Purdy | 160—189 |
| 3,048,761 | 8/1962 | Purdy | 49—25 X |
| 3,147,001 | 9/1964 | Purdy | 49—25 X |

J. KARL BELL, Primary Examiner

U.S. Cl. X.R.

49—360; 212—116